July 18, 1950  E. L. BECKWITH ET AL  2,515,582
ENVELOPE FOR FROZEN LIQUID REFRIGERANTS
Filed Jan. 8, 1948
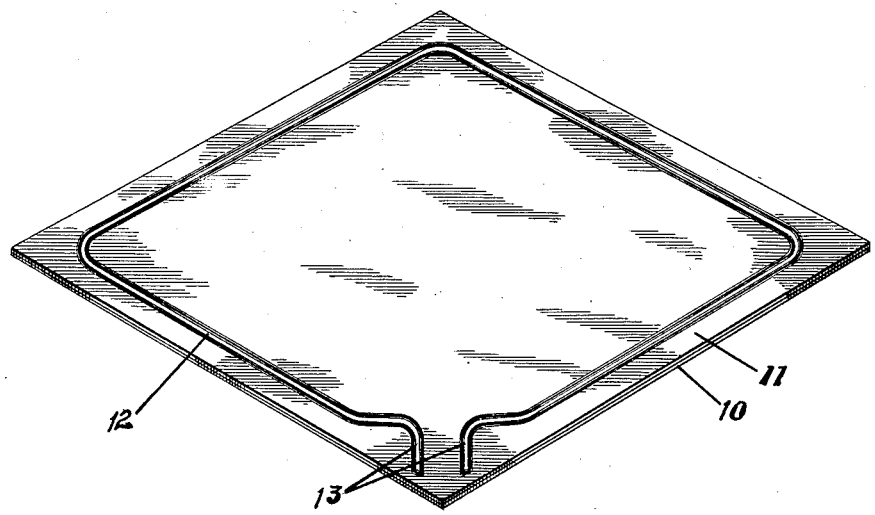
Fig:1.
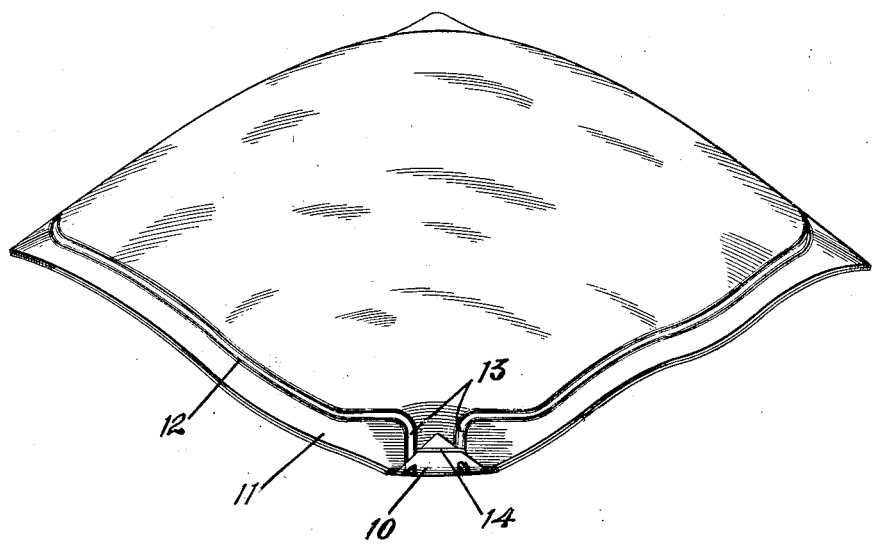
Fig.2.
INVENTORS
Edwin L. Beckwith & George C. Calhurn
By Kenway, Jenney, Witter & Hildreth Attys Patented July 18, 1950

2,515,582

UNITED STATES PATENT OFFICE 2,515,582

ENVELOPE FOR FROZEN LIQUID REFRIGERANTS

Edwin L. Beckwith, West Newton, and George C. Colburn, Natick, Mass.

Application January 8, 1948, Serial No. 1,098

4 Claims. (Cl. 62—1)

This invention comprises a new and improved envelope constructed of a tough elastic resinous material having the characteristics of plasticized Vinylite and adapted to contain a frozen refrigerant.

There are numerous industries in this country and abroad which are faced with the problem of either freezing their product or maintaining it in cool condition. Among these are the fish industry and the ice cream industry.

In the fish industry it is the practice to place the fish as caught or for shipment in barrels with layers of chopped ice on the top and bottom, with or without the addition of salt. A serious objection to this practice is the non-product weight on which shipping charges must be paid. Another objection is the wet conditions to which the fish are subjected for long periods. Dry ice is not satisfactory since it freezes the fish into an unusable condition. Metal brine pads or tanks for holding brine solution are generally too expensive for the industry, and also their use entails the necessity of their being returned after shipment for repeated use.

In the ice cream industry, metal brine pads are sometimes used but the same objections apply. Dry ice is also used to some extent but it has the objection that the ice cream is frozen so hard as to make it unpalatable for a long time.

Both of these industries have been striving for some time to find a more economical and efficient means for freezing or cooling their products so that they may arrive in a condition acceptable to the consumer.

Some attempts have been made to employ paper sacks made waterproof by means of a rubber coating, but these have proved difficult to seal when filled and are neither sufficiently tough nor sufficiently elastic to serve their intended purpose.

We have solved the problem of providing a satisfactory envelope for liquid refrigerants by superposing thin sheets of resinous material having the characteristics of plasticized Vinylite and a combined thickness approximating $1/64$ of an inch, sealing the two sheets together in a continuous narrow zone which defines an internal area closed except at one corner where the sealed zones extend in parallel spaced relation defining a short neck which may be sealed by merely folding the corners of the envelope in which the neck is located.

These and other features of the invention will be best understood and appreciated from the following description of a preferred embodiment thereof selected for purposes of illustration and shown in the accompanying drawings, in which:

Fig. 1 is a view in perspective of the envelope in flat unfilled condition, and

Fig. 2 is a corresponding view of the envelope filled with a frozen liquid refrigerant.

In its preferred embodiment the envelope of our invention is formed of two similar sheets of thin, flexible and elastic resinous material such as plasticized Vinylite having a combined thickness of about 0.013 inch. Vinylite, which is a copolymer of polyvinyl chloride, cellulose acetate, Koroseal, or any other plasticized resinous material having the characteristics of Vinylite, namely, toughness, flexibility, elasticity and freedom from odor, may be used as equivalent material. It is not necessary to list additional materials suitable for purposes of our invention since these are well known to those familiar with the synthetic rubber industry.

As herein shown, the sheets 10 and 11 are rectangular or square in shape and may be of any convenient size, for example 10" square. In constructing the bag the sheets are superposed and then united by heat sealing in a narrow continuous zone 12 which extends continuously about the margin of the sheet about $3/8$ of an inch within its edge except in one corner area where the lines of the sealed zone are deflected inwardly in reentrant angles and then outwardly in spaced relation forming a short neck 13 directed symmetrically toward the corner of the bag. The short neck thus formed permits easy and secure sealing of the bag by merely folding over one corner, making an intersecting fold vertex in the material of the bag as shown in Fig. 2, catching the ends of the sealed zone 12 in the fold, and fastening the corner in folded-over condition by a staple 14 or other convenient metal clip. The bag thus formed takes up very little room and the user can conveniently purchase them in cartons of a thousand or more, occupying small storage space from which they may be drawn as needed.

The operation of sealing the sheets together may be carried out by the application of heat generated in any convenient manner including electronic means, or a solvent may be employed to effect a sealing bond between the sheets. In the drawings the sealed zone is represented by parallel lines which define its width. Of course, the invention is not limited to the use of rectangular sheets but may be employed in connection with shapes of any convenient character.

In use the bag may be filled with brine or other liquid refrigerant, sealed as above explained, and frozen into a solid unit. One example of a satisfactory refrigerant is a 20% brine which freezes into solid brine ice and has a eutectic point of zero degrees F. One gallon of 20% brine includes about 8.3 lbs. of water and 2 lbs. sodium chloride. Whenever calcium chloride is available this may be utilized to advantage instead of sodium chloride.

It will be apparent that the only loss sustained in storage from the frozen unit of our invention is loss of refrigerating capacity by absorption of heat and this may be renewed at any time by refreezing. In the manufacture of ice cream there is usually available a hardening room at a temperature around zero degrees F., and when the brine ice is formed and the packaged brine ice stored in the hardening room, loss of refrigerating capacity is prevented. With the case of dry ice, however, there is a substantial loss due to sublimation and any recovery thereof is more expensive than initial production and is entirely beyond the facilities of the average manufacturer. Dry ice sublimates at approximately 100° below zero F., or substantially below the range of present day mechanical equipment. On the contrary, the brine ice refrigerant used in the envelope of our invention may be frozen and refrozen at zero degrees F.

The cost of the envelope above described is sufficiently low in comparison to ice that it is disposable, since the combined cost of the brine and the bag will be less than the cost of dry ice or the cost of a metal pad plus handling and return charges.

Having thus disclosed our invention, we claim as new and desire to secure by Letters Patent:

1. An envelope for refrigerant, comprising two rectangular sheets of elastic plasticized Vinylite film approximately 1/64 of an inch in combined thickness, superposed and sealed together in a zone approximately .125 inch wide that extends about the marginal edges of the sheets except at one corner, portions of the sealed zone in that area being spaced from each other and extending in parallel relation, thereby providing an inlet passage to the enclosed area of the envelope which may be closed by forming an intersecting fold vertex.

2. An envelope for refrigerant, comprising a pair of superposed sheets of elastic resinous material having the characteristics of plasticized Vinylite, namely, toughness, flexibility, elasticity and freedom from odor, lying in flat face-to-face contact and having a combined thickness of approximately 1/64 of an inch, the two sheets being sealed together in a continuous narrow zone which defines a rectangular internal area closed except at one corner where portions of the sealed zone extend in parallel spaced relation, the sheets being folded to close the space between the sealed zons, and a fastening device for holding them thus folded.

3. An envelope for refrigerant, comprising thin superposed rectangular sheets of elastic resinous material selected from the group consisting of Vinylite, cellulose acetate and Koroseal, lying flat in face-to-face contact and sealed together on a line which extends parallel to and within the margins of the sheets except in an area adjacent to one corner thereof, in that area the line of seal making reentrant oppositely disposed curves leading to and in part defining a short neck which provides an inlet passage to the area within the line of seal.

4. An envelope for refrigerant, comprising a pair of superposed sheets of material selected from the group consisting of Vinylite, cellulose acetate and Koroseal, lying in flat face-to-face contact, the two sheets being sealed together in a continuous narrow zone, which defines an internal area closed except in one place where the sealed zones extend in parallel spaced relation, thus defining a filling entrance capable of being conveniently closed when the envelope has been filled.

EDWIN L. BECKWITH.
GEORGE C. COLBURN.

REFERENCES CITED

The following references are of record in the file of this patent:

UNITED STATES PATENTS

| Number | Name | Date |
| --- | --- | --- |
| 2,125,318 | Salfisberg | Aug. 2, 1938 |
| 2,203,591 | Brown | June 4, 1940 |
| 2,368,645 | De Sylva | Feb. 6, 1945 |